(12) United States Patent
Inada

(10) Patent No.: US 9,342,897 B2
(45) Date of Patent: May 17, 2016

(54) IN-VEHICLE TARGET DETECTING DEVICE

(71) Applicant: DENSO CORPORATION, Kariya, Aichi-pref. (JP)

(72) Inventor: Junya Inada, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 184 days.

(21) Appl. No.: 14/159,563

(22) Filed: Jan. 21, 2014

(65) Prior Publication Data

US 2014/0205144 A1   Jul. 24, 2014

(30) Foreign Application Priority Data

Jan. 22, 2013   (JP) ................................. 2013-009350

(51) Int. Cl.
*G06T 7/20*   (2006.01)
*G06K 9/00*   (2006.01)

(52) U.S. Cl.
CPC .......... *G06T 7/2093* (2013.01); *G06K 9/00791* (2013.01); *G06K 9/00805* (2013.01); *G06K 2209/27* (2013.01)

(58) Field of Classification Search
CPC ........... G06K 9/00791; G06K 9/00805; G06T 7/004; G06T 7/0079; G06T 7/20; G06T 7/2093; G06T 2207/10028; G06T 2207/30248; G06T 2207/30252; G06T 2207/30261; G01S 13/86; G01S 13/867; G01S 13/93; G01S 13/931

See application file for complete search history.

(56) References Cited

U.S. PATENT DOCUMENTS

| 6,492,935 | B1 | 12/2002 | Higuchi ......................... 342/70 |
| 2006/0125679 | A1 | 6/2006 | Horibe ............................ 342/52 |
| 2009/0201192 | A1* | 8/2009 | Tokoro et al. ....... B60R 21/0134 342/70 |

FOREIGN PATENT DOCUMENTS

| JP | 09-264954 A | 10/1997 | ............. G01S 13/93 |
| JP | 2001-099930 A | 4/2001 | ............. G01S 13/93 |
| JP | 2006-151125 A | 6/2006 | ............. B60R 21/00 |
| JP | 2011-027457 A | 2/2011 | ............. G01S 13/86 |
| JP | 2012-220377 A | 11/2012 | ............. G01S 13/93 |

OTHER PUBLICATIONS

Office Action dated Dec. 24, 2014 in corresponding Japanese Application No. 2013-009350.

* cited by examiner

*Primary Examiner* — Andrew W Johns
(74) *Attorney, Agent, or Firm* — Harness, Dickey & Pierce, P.L.C.

(57) ABSTRACT

In an in-vehicle target detecting device, a captured image which is an image capturing an area ahead of the own vehicle is acquired at a predetermined measurement cycle. Radio waves are transmitted and received. Positional information indicating at least an orientation and a distance of at least one target candidate in relation to the own vehicle is acquired. The target candidate reflects radio waves. Image recognition is performed to detect a detection object by searching a predetermined image search area in the captured image. At least an image detection position of the detection object in the captured image is stored. The image search area is set, based on an image-plane measurement position corresponding to a measurement position in the captured image. The measurement position is a position in three-dimensional space of the target candidate indicated by the positional information acquired at a timing at which the captured image is acquired.

21 Claims, 14 Drawing Sheets

IN-VEHICLE TARGET DETECTING DEVICE

CROSS-REFERENCE TO RELATED APPLICATION

This application is based on and claims the benefit of priority from earlier Japanese Patent Application No. 2013-009350 filed Jan. 22, 2013, the description of which is incorporated herein by reference.

BACKGROUND

1. Technical Field

The present invention relates to an in-vehicle target detecting device that is mounted in a vehicle and detects a target present near the vehicle.

2. Related Art

In related art, as an in-vehicle target detecting device that detects a target present near a vehicle, a sensor (such as a millimeter-wave sensor) that uses radio waves (millimeter waves) to detect the target, and an image sensor that uses an image captured by a camera to detect the target are known. The millimeter-wave sensor has a higher detection accuracy of the distance to the target and relative velocity, compared to the image sensor. The image sensor has a higher detection accuracy of the shape of the target (width and size) and the azimuth angle to the target, compared to the millimeter wave sensor.

Therefore, a device is considered in which both the millimeter-wave sensor and the image sensor are mounted in a vehicle (for example, refer to JP-A-2001-99930). In the device, output from either sensor that more accurately detects a detection item (distance, azimuth angle, and the like) is used as the detection result of the detection item. The device then detects the target based on the detection results.

However, in image recognition by the image sensor, in general, a plurality of secondary images are generated. The generated secondary images are composed of a captured image that is reduced in stages at a predetermined scale factor. Pattern matching for the target is then repeatedly performed on the overall image plane of each secondary image. A template that is prepared in advance is used for pattern matching. In this method of repeatedly performing pattern matching, a problem occurs in that processing volume during image processing is immense.

SUMMARY

It is thus desired to provide an in-vehicle target detecting device in which both a sensor that uses radio waves, such as millimeter waves, and an image sensor are mounted, and that is capable of reducing processing volume of image processing performed to identify a target in a captured image.

According to an exemplary embodiment of the present disclosure, there is provided an in-vehicle target detecting device including image acquiring means, positional information acquiring means, image recognition means, and search area setting means.

The image acquiring means repeatedly acquires, at a predetermined measurement cycle, a captured image that is an image capturing an area ahead of the own vehicle.

The positional information acquiring means transmits and receives radio waves to acquires positional information indicating at least an orientation and a distance of a target candidate in relation to the own vehicle. The target candidate reflects the radio waves. The target candidate refers to a single target (object) or a plurality of targets (objects) that reflect the radio waves. In other words, the target candidate detected by the radio waves is not limited to a single object.

The image recognition means performs image recognition to detect a predetermined object (detection object) by searching a predetermined image search area in the captured image. The image recognition means stores at least an image detection position which is a position of the detection object in the captured image.

The search area setting means sets an image search area based on an image-plane measurement position that is a position corresponding to a measurement position in the captured image. The measurement position is a position in three-dimensional space of the target candidate indicated by the positional information acquired by the positional information acquiring means at the timing at which the captured image is acquired by the image acquiring means.

Therefore, in the in-vehicle target detecting device of the exemplary embodiment image processing is not performed on the overall captured image. Rather, the search area on which image processing is performed is limited using the distance and orientation of the target candidate in three-dimensional space. Therefore, the processing volume of image processing can be reduced.

In general, in measuring means that uses radio waves such as millimeter waves, the detection accuracy of distance is high. However, the detection accuracy of orientation is not has high as the detection accuracy of distance. This is because azimuth discrimination is reduced as a result of spreading of the radio waves. Therefore, in the measuring means that uses millimeter waves, it is difficult for a plurality of detection objects positioned relatively far from the own vehicle and positioned near one another to be detected separately.

Here, for example, the image search area can be set to be wide in a lateral direction with reference to the image-plane measurement position (at the center). The lateral direction matches the direction of the vehicle width of the own vehicle on the image plane. As a result, the plurality of detection objects that are positioned near one another can be detected without omission. However, the processing volume of image processing increases. On the other hand, when the image search area is set to be narrow in the lateral direction, detection omission of any of the plurality of detection objects that are positioned near one another may occur.

Therefore, the in-vehicle target detecting device may include a target state estimating means that estimates whether or not the target candidate is configured by a plurality of detection objects. The search area setting means may include a base search area setting means and a search area switching means. The base search area setting means sets a first search area set in advance as the image search area, when the target state estimating means estimates that the target candidate is not configured by a plurality of detection objects.

On the other hand, the search area switching means switches the image search area to a second search area, when the target state estimating means estimates that the target candidate is configured by a plurality of detection objects. The second search area is an area by broadening the first search area in the lateral direction matching the direction of the vehicle width of the own vehicle in the captured image.

Therefore, in the in-vehicle target detecting device such as that described above, when the target candidate present ahead of the vehicle is estimated as being configured by a plurality of detection objects, the image search area is set to a wider area. Therefore, detection omission of the detection objects can be suppressed.

In addition, when the target candidate present ahead of the vehicle is estimated as not being configured by a plurality of detection objects, the first search area is set as the image search area. As a result, increase in the processing volume of image processing can be suppressed.

DESCRIPTION OF EMBODIMENTS

First Embodiment

A first embodiment of the present invention will hereinafter be described with reference to the drawings.

Figure 1:
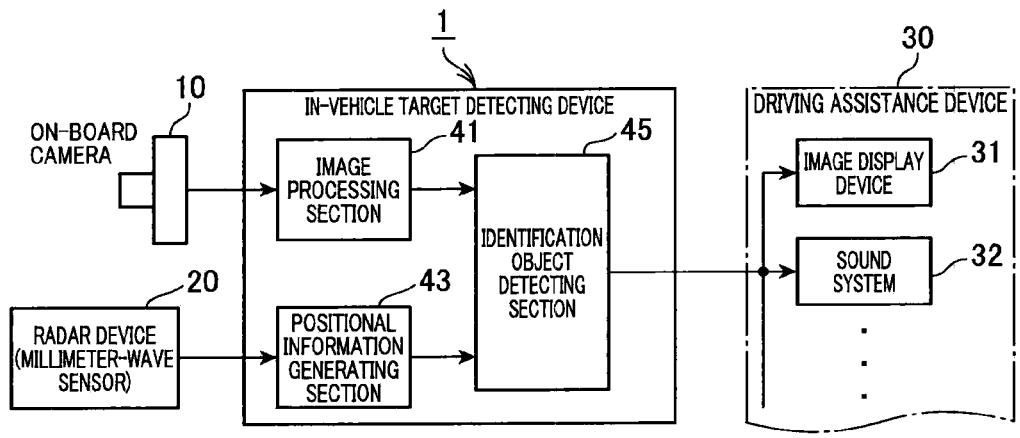
FIG. 1 is a block diagram showing an in-vehicle target detecting device according to a first embodiment.

As shown in FIG. 1, an in-vehicle target detecting device 1 of the present invention is connected in a communicable manner to an on-board camera 10, a radar device 20, and a driving assistance device 30.

The on-board camera 10 is composed of an image sensor. The on-board camera 10 captures an image of an area ahead of an own vehicle at an imaging cycle set in advance. The on-board camera 10 then outputs image data of the captured image to the in-vehicle target detecting device 1.

The radar device 20 outputs positional information to the in-vehicle target detecting device 1. The positional information indicates a relative positional relationship with a target candidate detected by transmission and reception of radio waves (millimeter waves herein).

The driving assistance device 30 performs various driving assistance operations based on output from the in-vehicle target detecting device 1. On-board devices that are subject to control by the driving assistance device 30 include at least an image display device 31 and a sound system 32. The image display device 31 displays various images. The sound system 32 outputs warning sounds and audio guidance.

The in-vehicle target detecting device 1 includes an image processing, section 41, a positional information generating section 43, and an identification object detecting section 45. The image processing section 41 generates a plurality of secondary images b, c, . . . (see FIG. 2) using image data acquired from the on-board camera 10.

Figure 2:
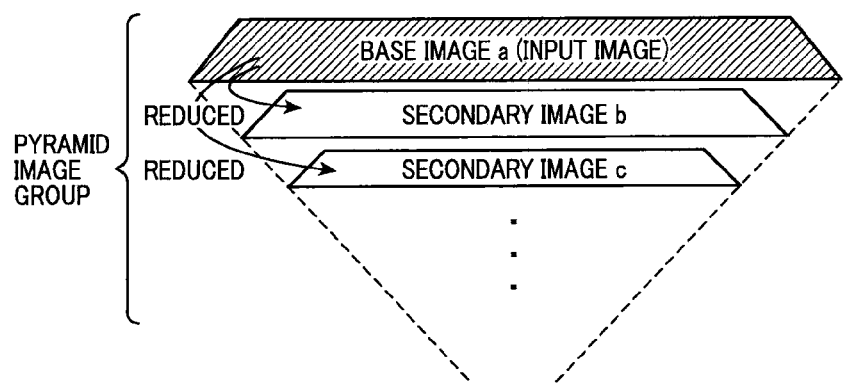
FIG. 2 is an explanatory diagram for explaining a pyramid image group.

As shown in FIG. 2, the plurality of secondary images b, c, . . . are a captured base image a that has been reduced in stages at a predetermined scale factor (the captured image and the plurality of secondary images are hereinafter referred to as a pyramid image group). The positional information generating section 43 outputs, to the identification object detecting section 45, positional information inputted from the radar device 20 every time the on-board camera 10 acquires a captured image.

The identification object detecting section 45 searches an image search area in the captured image. The image search area is set using the image data inputted from the image processing section 41 and the positional information generated by the positional information generating section 43. The identification object detecting section 45 judges whether or not a target candidate detected by the radar device 20 is a predetermined object (detection object, for example, a vehicle). In the present embodiment, this object is described as a vehicle, as needed.

When judged that the target candidate is the detection object, the identification object detecting section 45 stores an image detection position that is the position of the target candidate (detection object) on the captured image. The identification object detecting section 45 then outputs the image detection position to the driving assistance device 30.

Whether or not the target candidate detected by the radar device 20 is the detection object is judged by a so-called pattern matching process. In other words, first, the identification object detecting section 45 selects a single image or a plurality of images from the pyramid image group inputted from the image processing section 41 (see FIG. 3).

The identification object detecting section 45 selects the image or images based on the distance from the own vehicle to the target candidate detected as positional information. Furthermore, the identification object detecting section 45 sets an image search area within the image plane of the selected image.

Then, the identification object detecting section 45 performs the pattern matching process as follows. The identification object detecting section 45 successively moves a template over the image search area. The template is image data indicating the detection object and is prepared in advance.

The identification object detecting section 45 then calculates the degree of coincidence with the template, thereby judging whether or not the detection object is present in the image search area. The size of the template is set to a size in which the target object (vehicle) positioned at a certain predetermined distance away from the own vehicle appears on the image plane of the captured image.

Here, the image search area is set as follows. In other words, first, the identification object detecting section 45 converts the positional information to an image-plane measurement position, with a position in a three-dimensional space of the target candidate indicated by the positional information generated by the positional information generating section 43 as a measurement position, and a position in the captured image corresponding to the measurement position as the image-plane measurement position.

Figure 4:
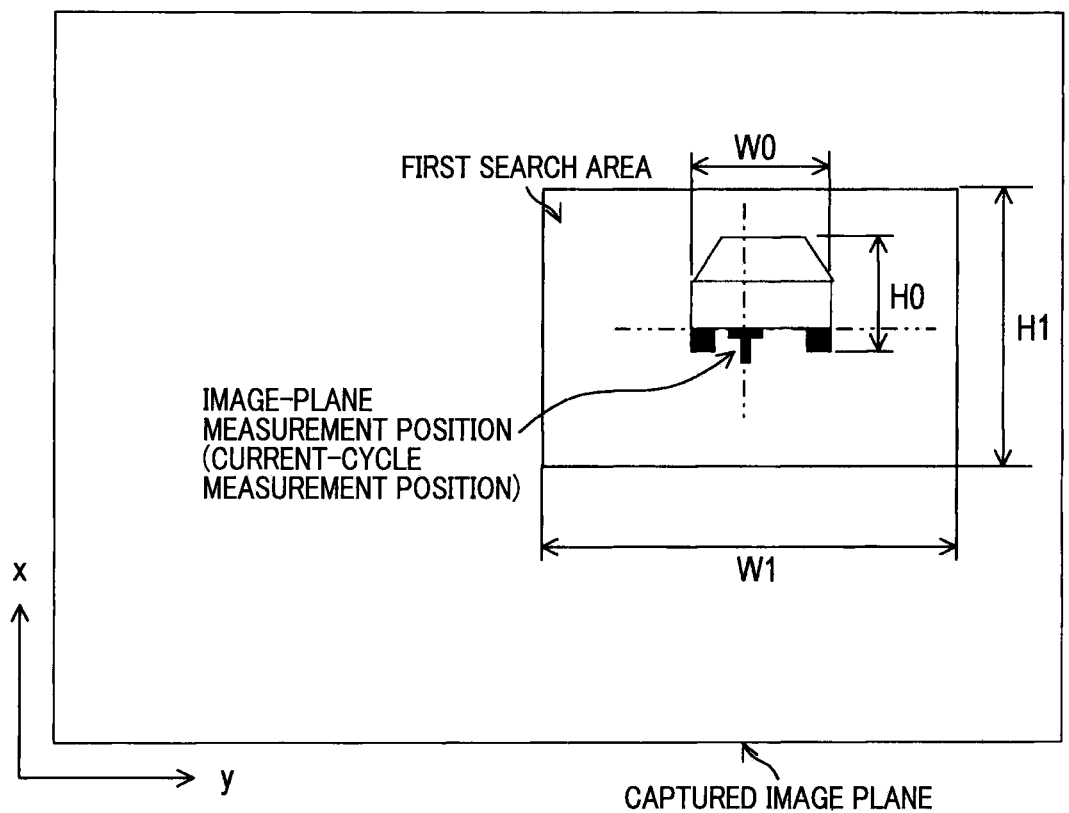
FIG. 4 is an explanatory diagram for explaining a first search area.

As shown in FIG. 4, in the captured image, a direction matching the vehicle width direction of the own vehicle is a lateral direction. A direction matching the orientation of the vehicle body of the own vehicle is a vertical direction. The image-plane measurement position is expressed by x-y coordinates in which the vertical direction is an x-axis direction and the lateral direction is a y-axis direction. Hereafter, in particular, the position in the y-axis direction is referred to as a lateral position.

When the target candidate is estimated to be configured by a single detection object, the identification object detecting section 45 sets a first search area as the image search area. The first search area is a predetermined area of which the center is the image-plane measurement position of the target candidate.

Here, with the width of a vehicle of a standard size in the captured image as W0 and the height of the vehicle as H0, the first search area is set to a rectangular shape of which the size W1 in the lateral direction is three times the size of W0, and the size in the vertical direction is twice the size of H0.

Figure 5:
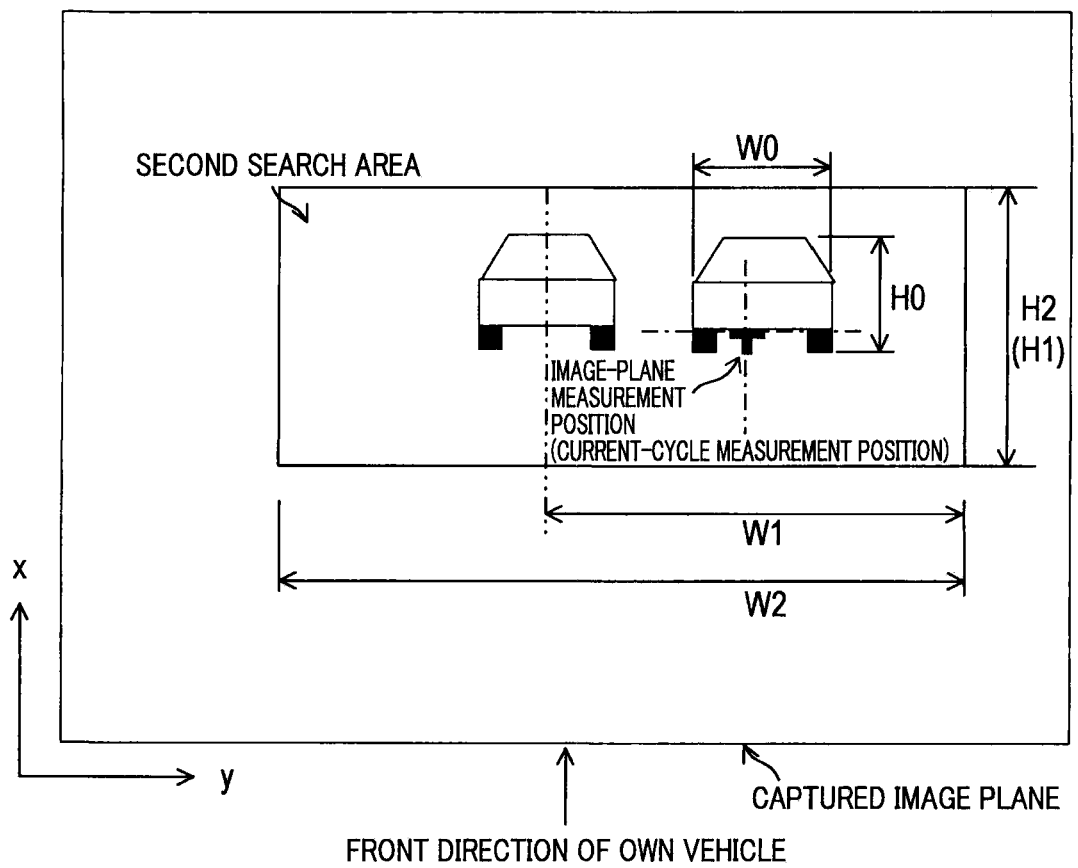
FIG. 5 is an explanatory diagram for explaining a second search area.

However, when the target candidate is estimated to be configured by a plurality of detection objects positioned at distances near one another, as shown in FIG. 5, the identification object detecting section 45 sets a second search area as the image search area. The second search area is an area in which, of the end portions in the lateral direction of the first search area, the side nearest to the position indicating the front of the own vehicle on the captured image plane is enlarged by a predetermined width.

Here, the position indicating the front of the own vehicle is set in the substantially center of the captured image plane. In addition, the second search area is set to a rectangular shape of which a size H2 in the vertical direction is equal to the size H1 of the first search area, and a size W2 in the lateral direction is greater than the size W1 of the first search area by an amount equivalent to twice the size of W0.

When the target candidate is estimated to be composed of a plurality of detection objects positioned at distances near one another, the image search area is set such as to be widened in the lateral direction as described above for the following reason.

Figure 6A:
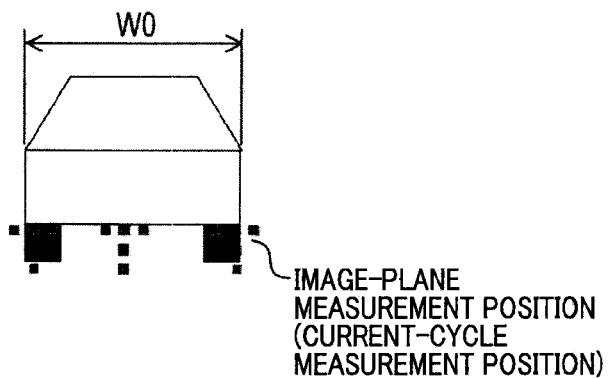
FIG. 6A is an explanatory diagram for explaining an area in which image-plane measurement positions vary when a target candidate is configured by a single detection object.

In other words, when the target candidate is composed of a single detection object, as shown in FIG. 6A, the image-plane measurement position, or in other words, the position at which the millimeter-wave reception signal is at peak intensity is detected such as to vary within the area of the vehicle width W0, as a result of the millimeter waves being reflected by the rear bumper, the license plate, and the like of the vehicle.

On the other hand, in a case where the target candidate is estimated to be composed of a plurality of detection objects positioned at distances near each other, when the detection objects are positioned at a predetermined distance (several tens of meters) or more away from the own vehicle, the detection objects are difficult to detect separately as a result of reduced azimuth discrimination caused by the spreading of the millimeter waves.

Figure 6B:
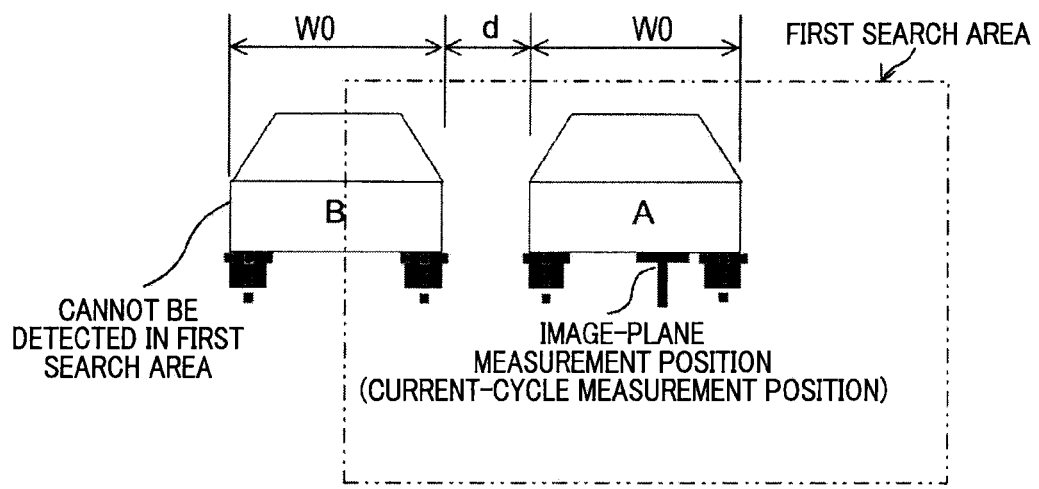
FIG. 6B is an explanatory diagram for explaining a relationship between the area in which the image-plane measurement positions vary and the first search area when the target candidate is configured by a plurality of detection objects that are positioned near one another.
Figure 6C:
FIG. 6C is an explanatory diagram of an example of intensity distribution of millimeter-wave reception signals in the instance in FIG. 6B.

In other words, as shown in FIG. 6B and FIG. 6C, when two vehicles A and B are positioned near each other with a distance d therebetween, the position (image-plane measurement position) at which the intensity of the millimeter-wave reception signal is a maximum value is detected such as to vary over an area exceeding the vehicle width W0 of a single vehicle.

The distance d is a value that is a separate-detection enabling distance or less. The separate-detection enabling distance is a distance at which detection objects that are near one other can be detected separately. The separate-detection enabling distance is determined by the capability of the radar device 20 and the like.

Here, when the image search area is set such as to be narrow in the lateral direction on the image plane, either of the two vehicles A and B may not be detected. In addition, when the image search area is set such as to be wide in the lateral direction, while detection omission can be prevented, the processing volume of image processing increases.

Therefore, when the target candidate is estimated to be composed of a plurality of detection objects positioned at distances near one another as described above, the second search area is set as the image search area instead of the first search area.

The identification object detecting section 45 performs estimation of whether or not the target candidate is composed of a plurality of detection objects positioned at distances near one another in the following manner.

Figure 7:
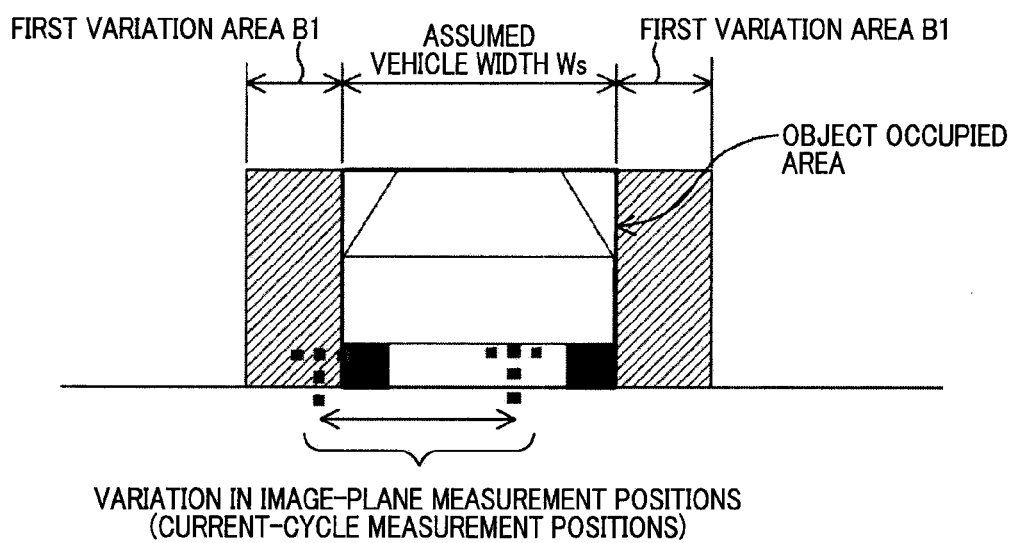
FIG. 7 is an explanatory diagram for explaining a first variation area.

First, as shown in FIG. 7, the identification object detecting section 45 sets the width (equivalent to a "vehicle width") of a rectangular area (equivalent to an "object occupied area") occupied by a vehicle in the captured image as an assumed vehicle width Ws (equivalent to an "object estimated width").

Then, when the image-plane measurement positions in the current measurement cycle are positioned in a first variation area B1, the identification object detecting section 45 estimates that the target candidate composed of a plurality of detection objects that are near one another. The first variation area B1 is a predetermined area set outside of the assumed vehicle width Ws in the lateral direction The assumed vehicle width Ws is a vehicle width of a vehicle (detection object) detected by image processing in a position corresponding to an image-plane measurement position (referred to, hereinafter, as a previous measurement position) of a previous measurement cycle.

When the detection result detected by image processing at the position corresponding to the previous measurement position is not used, the presumed vehicle width Ws is a vehicle width of an ordinary vehicle (such as a passenger vehicle) in the captured image. In addition, the size in the lateral direction of the first variation area B1 is set based on the separate-detection enabling distance, the width in the lateral direction of the detection object, and the like. Here, the lateral-direction size is set to about 0.5 m to 1 m.

The image processing section 41, the positional information generating section 43, and the identification object detecting section 45 are actualized by processes performed by a known microcomputer. The microcomputer includes a central processing unit (CPU), a read-only memory (ROM), a random access memory (RAM), and the like. The process for generating the pyramid image, performed by the image processing section 41, is already known. Therefore, description thereof is omitted herein.

In the process performed by the positional information generating section 43, a distance to a reflection point at which a radar wave is reflected is determined using a time difference from a transmission timing of the radar wave to a reception timing of the reflected wave. In addition, a direction from which the reflected wave arrives is determined from the irradiation direction of the radar wave, the direction of a received beam, or the like.

These pieces of information are then used to detect a target candidate based on distribution of reflection points. This process is already known. Therefore, description thereof is omitted herein. Hereafter, the processes performed by the identification object detecting section 45 will be described.

The details of an identification object detecting process performed by the identification object detecting section 45 will be described with reference to the flowchart shown in FIG. 8. In this example, a program that enables the identification object detecting section 45 to perform the identification object detecting process as shown in the flowchart of FIG. 8 is stored in advance in a memory (e.g., ROM) of the identification object detecting section 45, and then is retrieved from the memory when executed by the CPU of the identification object detecting section 45.

Figure 8:
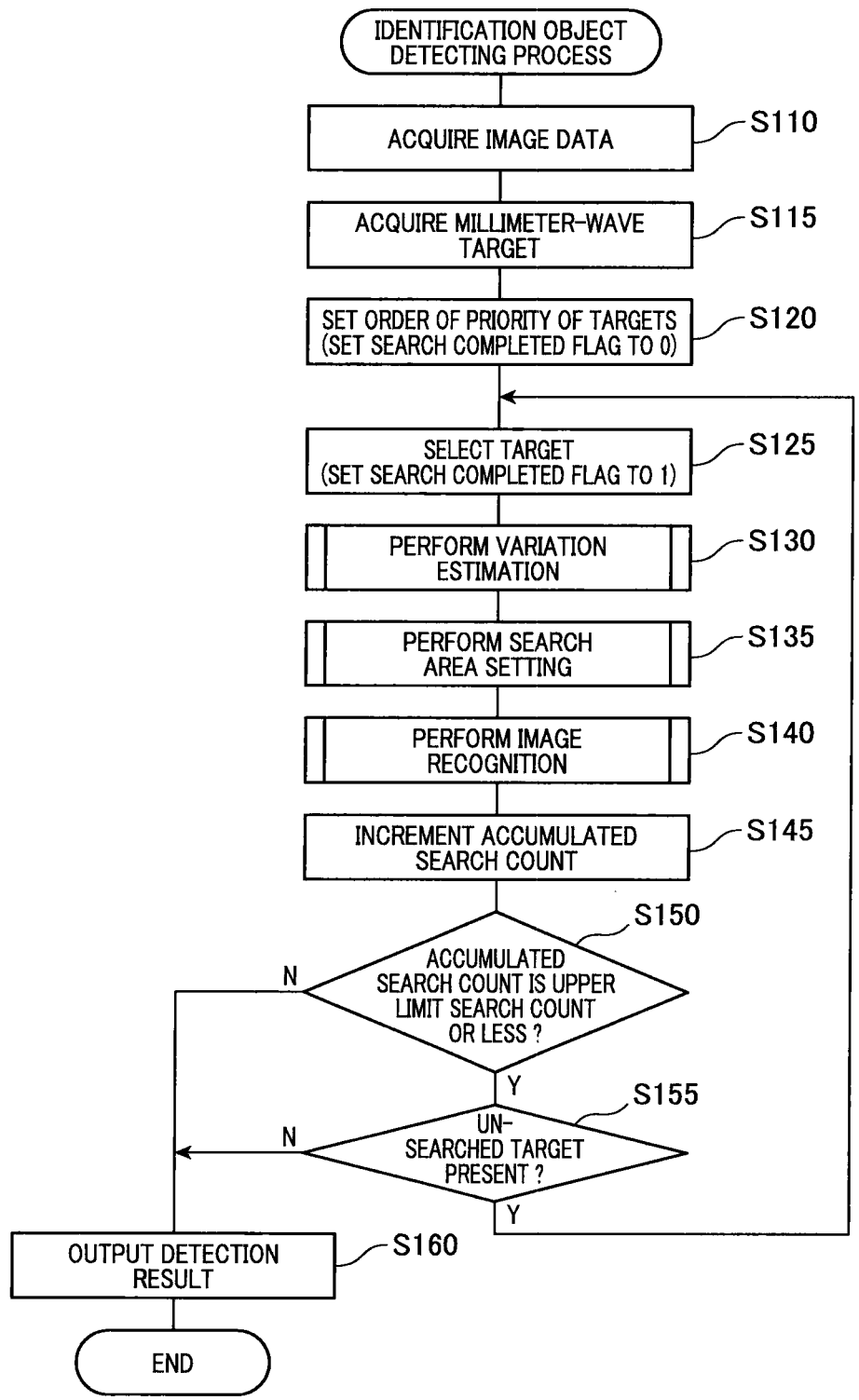
FIG. 8 is a flowchart showing a process for an identification object detecting process.

The identification object detecting process shown in FIG. 8 is repeatedly started at every imaging cycle of the on-board camera 10. When the identification object detecting process is started, first, at step S110 (equivalent to a process serving as a function provided by "image acquiring means"), the identification object detecting section 45 acquires image data (image data of the pyramid image) of the current measurement cycle from the image processing section 41.

Next, at step S115 (equivalent to a process serving as a function provided by "positional information acquiring means"), the identification object detecting section 45 acquires positional information of a target candidate in the current measurement cycle from the positional information generating section 43.

At subsequent step S120 (equivalent to a process serving as a function provided by "priority order setting means"), when a plurality of target candidates that have reflected the millimeter waves are detected by the positional information generating section 43, the identification object detecting section 45 sets an order of priority for the target candidates. The order of priority is set such that priority becomes higher in order from the target candidate closest to the own vehicle to the target candidate farthest from the own vehicle. The order of priority is set using the positional information of the detected target candidates. Then, the identification object detecting section 45 resets (sets to 0) a search completed flag for each target candidate.

Next, at step S125, the identification object detecting section 45 selects a target candidate with the highest order of priority set at step S120, among the target candidates of which the search completed flag is set to 0. The identification object detecting section 45 sets the search completed flag of the selected target candidate to 1.

At subsequent step S130 (equivalent to a process serving as a function provided by "target state estimating means"), the identification object detecting section 45 performs a process for variation estimation (target state estimating process). The process for variation estimation is performed to estimate whether or not the target candidate selected at step S125 is composed of a plurality of detection objects.

Next, at step S135 (equivalent to a process serving as a function provided by "search area setting means"), the identification object detecting section 45 performs a process for setting the image search area in adherence to the result of variation estimation performed at step S130.

At subsequent step S140, the identification object detecting section 45 performs a process for image recognition on the image search area set at step S135. The identification object detecting section 45 judges whether or not the selected target candidate is a target object. When judged that the target candidate is the target object, the identification object detecting section 45 stores the image detection position of the target candidate. The image detection position is the position of the target candidate in the captured image.

Next, at step S145, the identification object detecting section 45 increments an accumulated search count that is the number of times the process for image recognition has been performed. At subsequent step S150, the identification object detecting section 45 judges whether or not the accumulated search count is an upper limit search value or less. The upper limit search value is the upper limit value of the accumulated search count.

Here, when judged that the accumulated search count is the upper limit search value or more (NO at step S150), the identification object detecting section 45 proceeds to step S160. On the other hand, when judged that the accumulated search count is less than the upper limit search value (YES at step S150), the identification object detecting section 45 proceeds to step S155.

At step S155, the identification object detecting section 45 judges whether or not an unprocessed target candidate is present among the target candidates for which the order of priority has been set. The unprocessed target candidate is a target candidate on which the processing operations at steps S130 to S140 (referred to, hereinafter, as a search process) have not been performed. Specifically, when not all search completed flags of the target candidates are set to 1, the identification object detecting section 45 judges that an unsearched target candidate is present.

Here, when judged that an unprocessed target candidate is present (YES at step S155), the identification object detecting section 45 proceeds to S125. The identification object detecting section 45 then repeatedly performs the series of processing operations at steps S130 to S150.

On the other hand, when judged that no unprocessed target candidates are present (NO at step S155), or in other words, when all search completed flags of the target candidates are set to 1, the identification object detecting section 45 proceeds to step 160.

Finally, at step S160, the identification object detecting section 45 outputs the position of the detection object on the image plane detected at S140 as the detection result. The identification object detecting section 45 then ends the identification object detecting process.

Next, the process for variation estimation performed at step S130 of the above-described process will be described with reference to the flowchart shown in FIG. 9. In this example, a program that enables the identification object detecting section 45 to perform the process for variation estimation as shown in FIG. 9 is stored in advance in a memory (e.g., ROM) of the identification object detecting section 45, and then is retrieved from the memory when executed by the CPU of the identification object detecting section 45.

Figure 9:
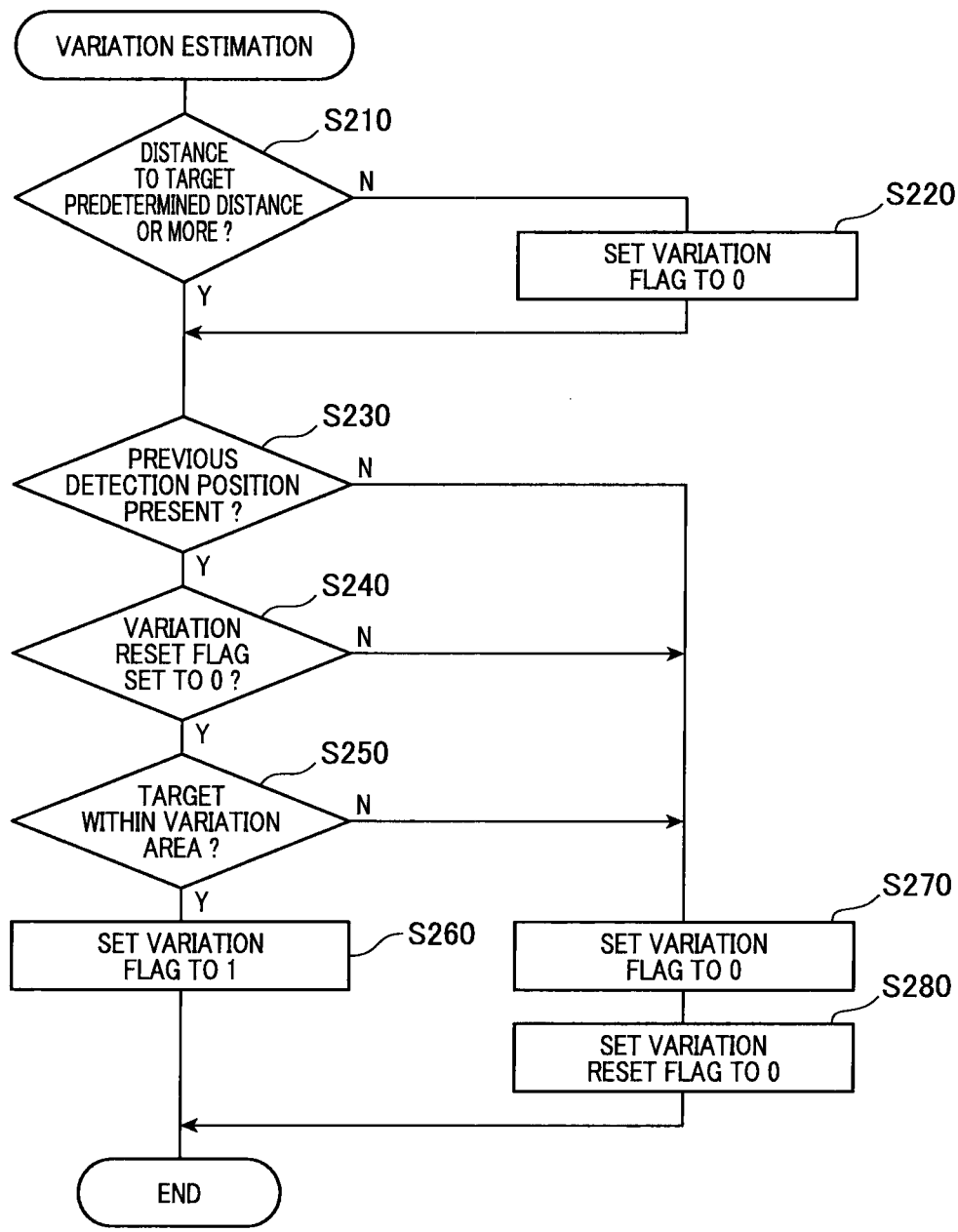
FIG. 9 is a flowchart showing a process for variation estimation.

At step S210 shown in FIG. 9, the identification object detecting section 45 judges whether or not the distance to the selected target candidate is a predetermined distance (several tens of meters) or more.

Here, when judged that the distance to the target candidate is less than the predetermined distance (NO at step S210), the identification object detecting section 45 proceeds to step S220. At step S220, the identification object detecting section 45 sets a variation flag to 0 and proceeds to step S230. On the other hand, when judged that the distance to the target candidate is the predetermined distance or more (YES at step S210), the identification object detecting section 45 proceeds to step S230.

Next, at step S230 (equivalent to a process serving as a function provided by "correlating means"), the identification object detecting section 45 judges whether or not an image detection position (hereinafter, referred to as a previous detection position) corresponding to the image-plane measurement position (referred to, hereinafter, as a current-cycle measurement position) of the target candidate selected in the current measurement cycle is present among the image detection positions of the detection objects detected by the image recognition process (step S140) performed in the previous measurement cycle.

Here, when judged that a previous detection position is not present (NO at step S230), the identification object detecting section 45 proceeds to step S270. On the other hand, when judged that the previous detection position is present (YES at step S230), the identification object detecting section 45 proceeds to step S240.

At S240, the identification object detecting section 45 judges whether or not a variation reset flag is set to 0. Here, when judged that the variation reset flag is not set to 0 (NO at step S240), the identification object detecting section 45 proceeds to step S270. On the other hand, when judged that the variation reset flag is set to 0 (YES at step S240), the identification object detecting section 45 proceeds to step S250.

Next, at step S250 (equivalent to a process serving as a function provided by "target state estimating executing means"), the identification object detecting section 45 judges whether or not the current-cycle measurement position is positioned within the above-described first variation area B1 (see FIG. 7).

Here, when judged that the current-cycle measurement position is positioned within the area of the first variation area B1 (YES at step S250), the identification object detecting section 45 proceeds to step S270. At step S270, the identification object detecting section 45 estimates that the selected target candidate is composed of a plurality of detection objects, and then sets the variation flag to 1. Then, the process for variation estimation is ended.

On the other hand, when judged that the current-cycle measurement position is positioned outside of the first variation area B1 (NO at step S250), the identification object detecting section 45 proceeds to step S270. At step 270 (equivalent to a process serving as a function provided by "target state estimation prohibiting means"), the identification object detecting section 45 estimates that the selected target candidate is not composed of a plurality of detection objects, and then sets the variation flag to 0. At subsequent step S280, the identification object detecting section 45 sets the variation reset flag to 0 and ends the process for variation estimation.

Next, the process for setting the search area performed at step S135 of the above-described process will be described with reference to the flowchart in FIG. 10. In this example, a program that enables the identification object detecting section 45 to perform the process for setting the search area as shown in FIG. 10 is stored in advance in a memory (e.g., ROM) of the identification object detecting section 45, and then is retrieved from the memory when executed by the CPU of the identification object detecting section 45.

Figure 10:
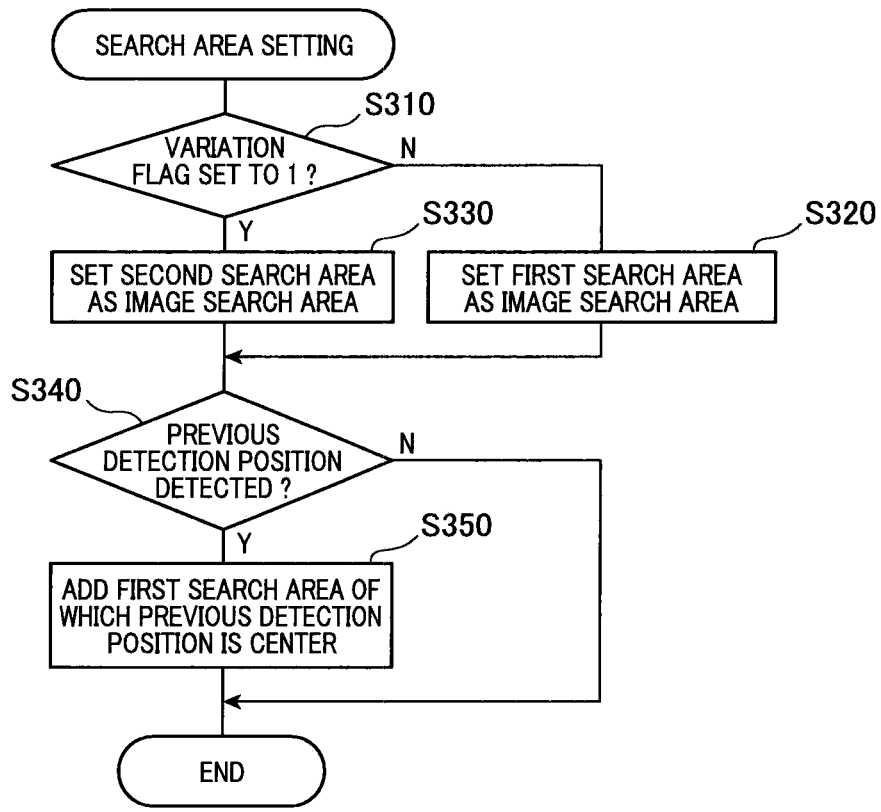
FIG. 10 is a flowchart showing a process for setting the search area.

First, at step S310 shown in FIG. 10, after performing the process for variation estimation, the identification object detecting section 45 judges whether or not the variation flag is set to 1.

Here, when judged that the variation flag is not set to 1 (NO at step S310), the identification object detecting section 45 proceeds to step S320. At step 320 (equivalent to a process serving as a function provided by "base search area setting means"), the identification object detecting section 45 sets the first search area as the image search area and proceeds to step S340.

On the other hand, when judged that the variation flag is set to 1 (YES at step S310), the identification object detecting section 45 proceeds to step S330. At step S330 (equivalent to a process serving as a function provided by "search area switching means"), the identification object detecting section 45 sets the second search area as the image search area and proceeds to step S340.

At subsequent step S340, the identification object detecting section 45 judges whether or not the previous detection position has been detected in the previous measurement cycle.

Here, when judged that the previous detection position has not been detected (NO at step S340), the identification object detecting section 45 ends the process for setting the search area.

On the other hand, when judged that the previous detection position has been detected in the previous measurement cycle (YES at step S340), the identification object detecting section 45 proceeds to step S350.

At subsequent step S350 (equivalent to a process serving as a function provided by "composite search area setting means"), the identification object detecting section 45 sets a composite search area as the image search area. The composite search area is a combined area of the first search area of which the previous detection position is the center and the image search area set at steps S320 or S330. The identification object detecting section 45 then ends the process for setting the search area.

Next, the process for image recognition performed at step S140 of the above-described process will be described with reference to the flowchart shown in FIG. 11. In this example, a program that enables the identification object detecting section 45 to perform the process for image recognition as shown in FIG. 11 is stored in advance in a memory (e.g., ROM) of the identification object detecting section 45, and then is retrieved from the memory when executed by the CPU of the identification object detecting section 45.

Figure 3:
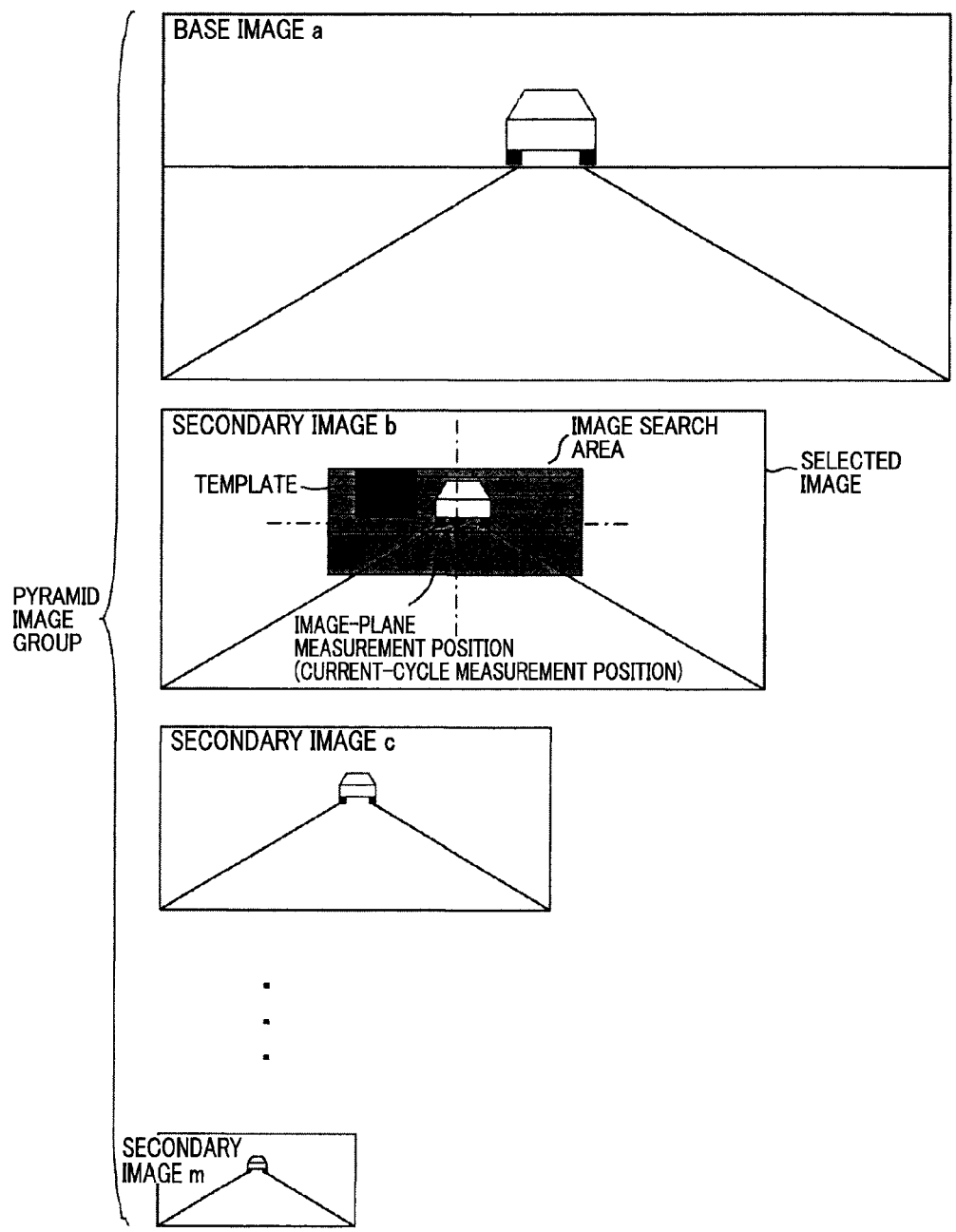
FIG. 3 is an explanatory diagram for explaining setting of an image search area and a pattern matching process performed in the image search area.
Figure 11:
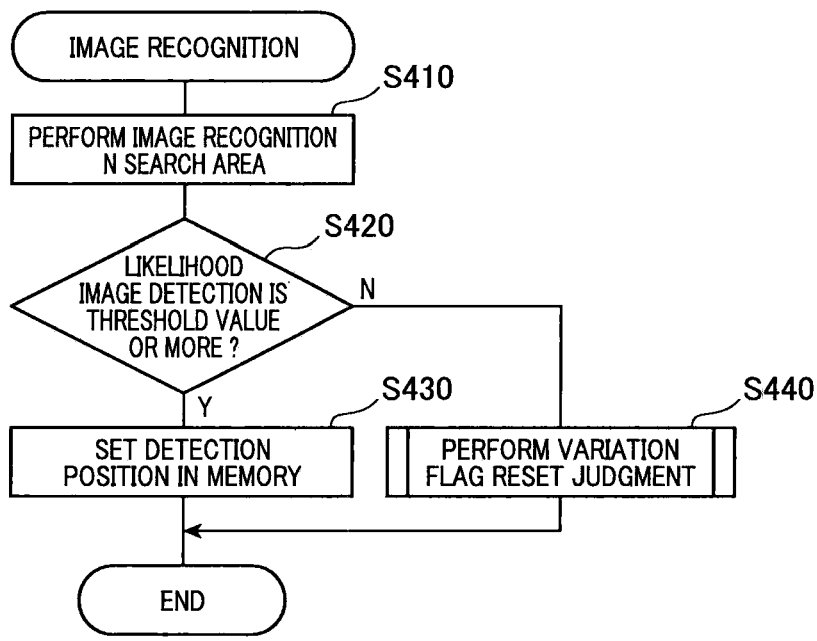
FIG. 11 is a flowchart showing a process for image recognition.

First, at step S410 (equivalent to a process serving as a function provided by "recognition value calculating means") shown in FIG. 11, the identification object detecting section 45 selects a single image or a plurality of images from the pyramid image group (see FIG. 2) inputted from the image processing section 41 (see FIG. 3). The identification object detecting section 45 selects the image or images based on the distance from the own vehicle to the target candidate detected as positional information.

Next, as shown in FIG. 11, the identification object detecting section 45 performs the pattern matching process. To perform the pattern matching process, the identification object detecting section 45 successively moves a template over the image search area set by the process for image search setting (step S135) on the image plane of the selected image. The template is image data indicating the detection object.

The identification object detecting section 45 then calculates a recognition value (likelihood) indicating the degree of coincidence with the template. Various known methods can be used in the pattern matching process. For example, a method using a support vector machine (SVM) or a method in which feature quantities are calculated may be used.

Next, at step S420, the identification object detecting section 45 judges whether or not the detection object (vehicle) is detected by pattern matching. In other words, the identification object detecting section 45 judges that the vehicle is detected when the recognition value (likelihood) indicating the degree of coincidence with the template is a predetermined image detection threshold or more.

Here, when judged that the vehicle is detected (YES at step S420), the identification object detecting section 45 proceeds to step S430. At step 430, the identification object detecting section 45 stores the position of the detected vehicle (image detection position) in the memory. The identification object detecting section 45 then ends the process for image recognition.

On the other hand, when judged that the vehicle is not detected (NO at step S420), the identification object detecting section 45 proceeds to step S440. At step S440 (equivalent to a process serving as a function provided by "search area resetting means"), the identification object detecting section 45 performs a process for variation flag reset judgment. The identification object detecting section 45 then ends the process for image recognition.

Next, the process for variation flag reset judgment performed in the process for image recognition (step S440) will be described with reference to the flowchart in FIG. 12. In this example, a program that enables the identification object detecting section 45 to perform the process for variation flag reset judgment as shown in FIG. 12 is stored in advance in a memory (e.g., ROM) of the identification object detecting section 45, and then is retrieved from the memory when executed by the CPU of the identification object detecting section 45.

Figure 12:
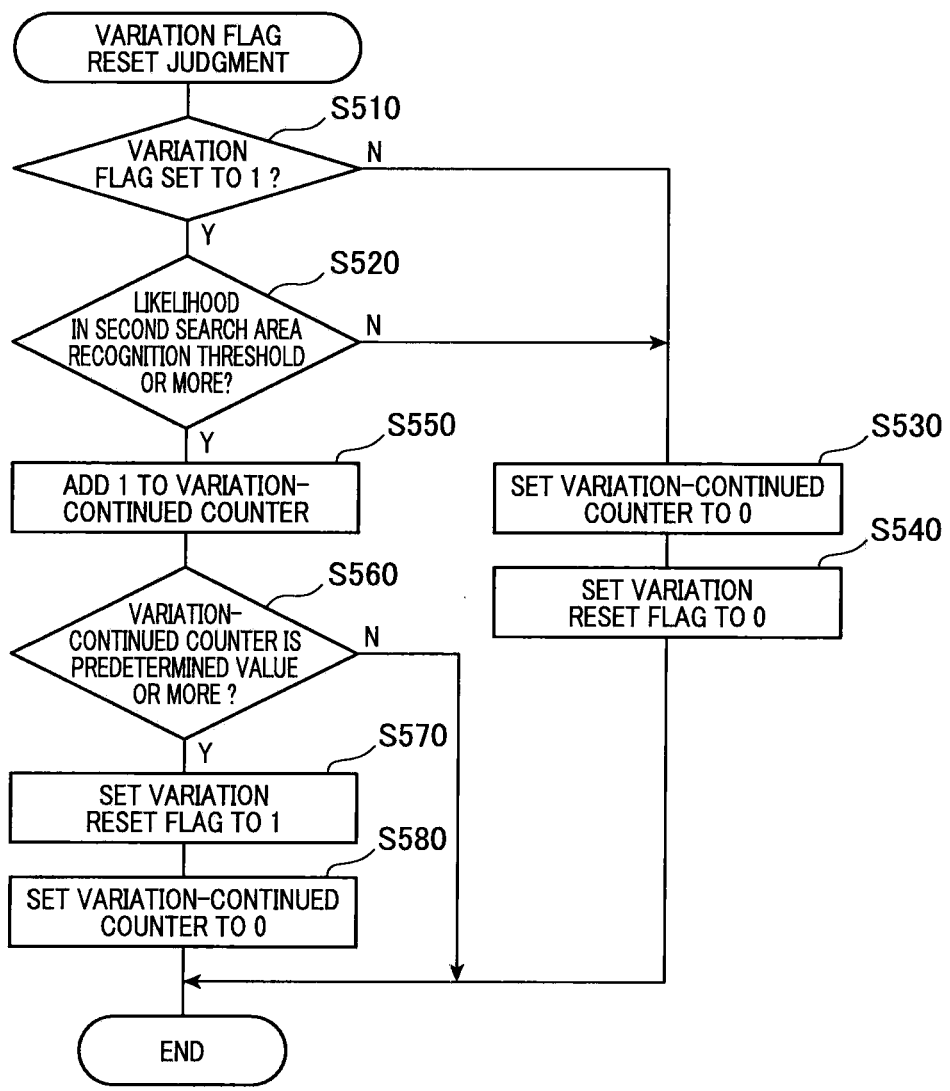
FIG. 12 is a flowchart showing a process for variation flag reset judgment.

First, at step S510 shown in FIG. 12, the identification object detecting section 45 judges whether or not the variation flag is set to 1. When judged that the variation flag is not set to 1 (NO at step S510), the identification object detecting section 45 proceeds to step S530. On the other hand, when judged that the variation flag is set to 1 (YES at step S510), the identification object detecting section 45 proceeds to step S520.

At subsequent step S520, the identification object detecting section 45 judges whether or not the likelihood acquired in the process for image recognition (step S140) exceeds a recognition threshold set in advance, in the second search area that is the image search area when the variation flag is set to 1.

When judged that the likelihood is less than the recognition threshold (NO at step S520), the identification object detecting section 45 proceeds to step S530. When judged that the likelihood is the recognition threshold or more (YES at step S520), the identification object detecting section 45 proceeds to step S550.

The identification object detecting section 45 proceeds to step S530 when the variation flag is not set to 1 (NO at step S510) or when the likelihood is less than the recognition threshold (NO at step S520). At step S530, the identification object detecting section 45 sets a variation-continued counter to 0.

At subsequent step S40, the identification object detecting section 45 sets the variation reset flag to 0. The identification object detecting section 45 then ends the process for variation flag reset judgment.

The identification object detecting section 45 proceeds to step S550 when judged that the likelihood is the recognition threshold or more (YES at step S520). At step S550, the identification object detecting section 45 adds 1 to the variation-continued counter, and proceeds to S560.

At subsequent step S560, when judged that the variation-continued counter is less than a predetermined count (five, herein) set in advance (NO at step S560), the identification object detecting section 45 ends the process for variation flag reset judgment. When judged that the variation-continued counter is the predetermined count or more (YES at step S560), the identification object detecting section 45 proceeds to step S570.

Next, at step S570, the identification object detecting section 45 sets the variation reset flag to 1. At subsequent step S580, the identification object detecting section 45 sets the variation—continued counter to 0. The identification object detecting section 45 then ends the process for variation flag reset judgment.

Here, the recognition threshold is set to a value that is less than the above-described image detection threshold to indicate that the probability of a detection object being detected in the search area is very low when the likelihood (recognition value) is less than the recognition threshold.

As described above, in the in-vehicle target detecting device 1, first, a single image or a plurality of images are selected from the pyramid image, based on the distance between the target candidate and the own vehicle.

Furthermore, the image search area is set in the selected image using the detection result based on the millimeter waves. The image recognition process using pattern matching is performed limitedly on the image search area. In a conventional method, the detection object is detected using all pieces of image data in a generated pyramid image group.

Therefore, compared to the method in related art, the present invention is capable of significantly reducing the processing volume of image processing performed by the microcomputer.

Figure 13:
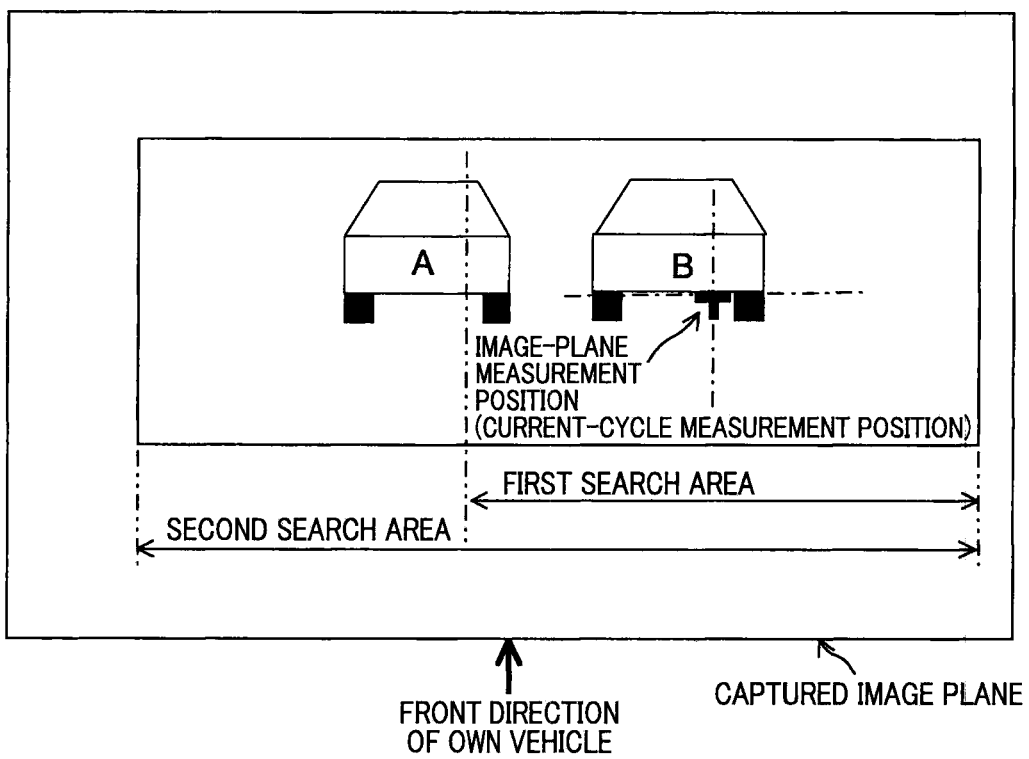
FIG. 13 is an explanatory diagram for explaining how detection of a plurality of detection objects positioned near one another becomes possible as a result of the second search area being set.

In addition, in the in-vehicle target detecting device 1, when a plurality of detection objects positioned near one another are estimated to be present at a distance far enough away that the azimuth discrimination by the millimeter waves is reduced, the second search area is set as the image search area instead of the first search area. Therefore, as shown in FIG. 13, all of the plurality of detection objects can be detected without omission.

Furthermore, the second search area is set to an area that is the first search area widened in the lateral direction towards the front side of the own vehicle. Therefore, detection objects present in the direction of the front of the own vehicle can be detected with certainty.

In addition, the second search area is widened only towards the front side of the own vehicle. Therefore, the image search area is not set to an unnecessarily large size. As a result, increase in the processing volume of image processing can be minimized.

Still further, in the in-vehicle target detecting device 1, when the detection object is not detected in the second search area over a predetermined number of measurement cycles set in advance (YES at step S560), the image search area is reset from the second search area to the first search area. As a result, increase in the processing volume of image processing can be suppressed.

When the target candidate is estimated as not being composed of a plurality of detection objects (NO at step S310), the first search area that is a default area is set as the image search area (step S320). Therefore, the processing volume of image processing is not unnecessarily increased.

In addition, in the in-vehicle target detecting device 1, when the detection object has been detected during image recognition (step S140) in the previous measurement cycle, the composite search area is set as the image search area (step S350).

In the composite search area, the image search area at the previous detection position and the image search area at the current-cycle measurement position are superimposed. As a result, detection omissions of the detection object in the image search area can be suppressed.

Still further, in the in-vehicle target detecting device 1, when the distance to the target candidate is less than a predetermined distance (NO at step S210), it is considered that the plurality of detection objects positioned near one another can be detected separately by the millimeter waves. Therefore, the process for variation estimation is not performed. As a result, the processing load on the microcomputer can be reduced.

In addition, in the in-vehicle target detecting device 1, when a plurality of target candidates are detected by the radar device 20, the search process is performed on only a predetermined number of target candidates (refer to step S150) in order from the target candidate closest to the own vehicle (refer to steps S120 and S125), among the detected target candidates.

Therefore, processing on a target candidate present near the own vehicle (in other words, a target candidate of which detection is of greater importance) can be performed with certainty, within a range of processing load on the microcomputer allowable for target detection.

Furthermore, in the in-vehicle target detecting device 1, even when the number of measurement cycles has not reached a predetermined number, when the likelihood in the second search area is calculated to be less than the recognition threshold (NO at step S520), the possibility of a plurality of detection objects positioned near one another being present in the second search area is assumed to be very low.

The variation-continued counter is reset (step S530). Therefore, at the next measurement cycle, the search area is reset from the second search area to the first search area. As a result, the processing volume of image processing can be suppressed.

Second Embodiment

A second embodiment of the present invention will hereinafter be described with reference to the drawings.

The device configuration is the same as that of the in-vehicle target detecting device 1 according to the first embodiment. However, the process for variation estimation performed by the identification object detecting section 45 differs in part from that according to the first embodiment. The difference will mainly be described.

Figure 14:
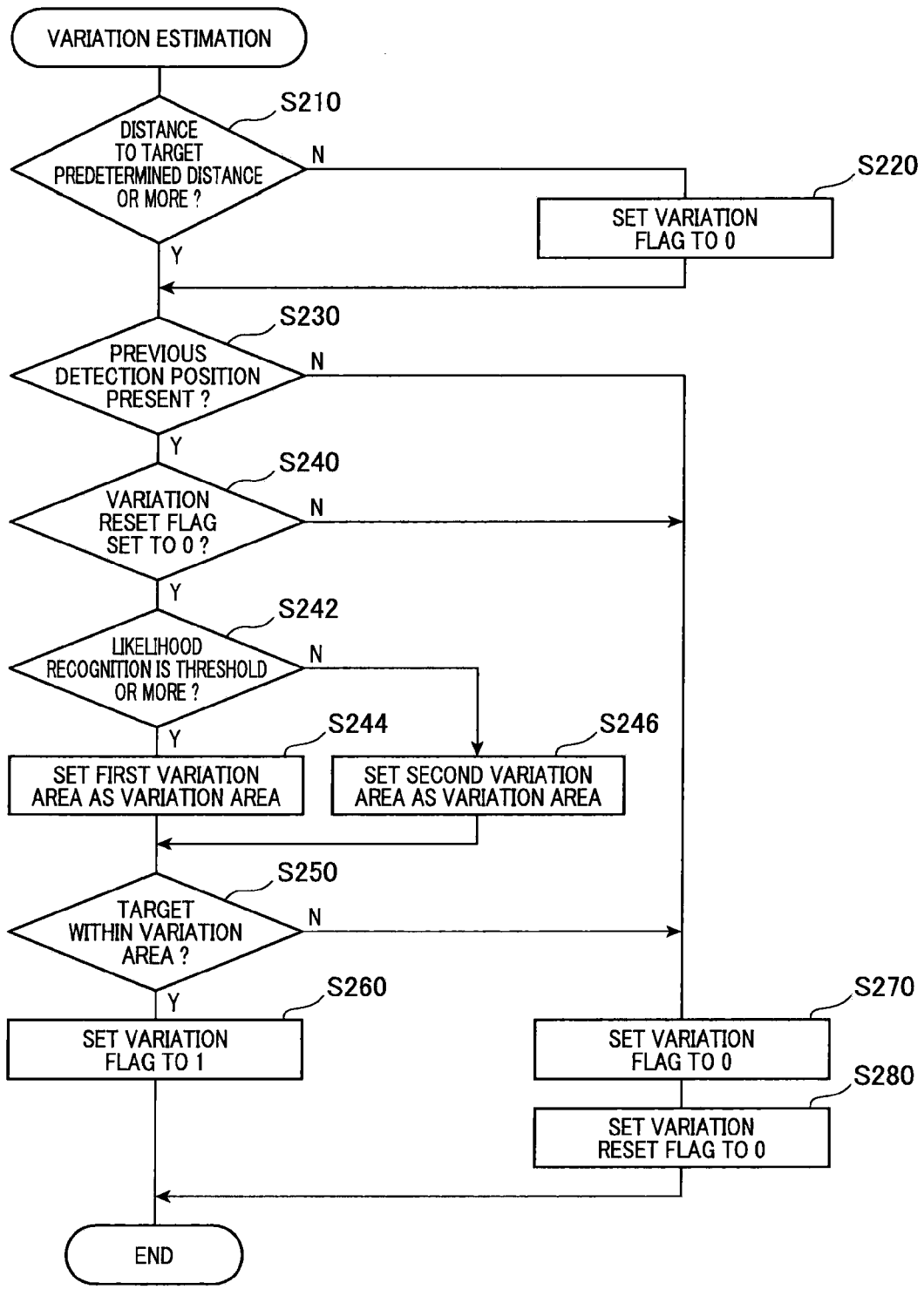
FIG. 14 is a flowchart showing a process for variation estimation according to a second embodiment.

As shown in FIG. 14, in the process for variation estimation of the second embodiment, steps S242 to S246 are added to the process shown in FIG. 9.

In other words, as when the process for variation estimation is started, the identification object detecting section 45 performs the processing operations at steps S210 to S240.

Thereafter, when judged that the previous detection position has been detected, the identification object detecting section 45 judges whether or not the likelihood of the detection object calculated in the process for image recognition (step S410) in the previous measurement cycle is the recognition threshold set in advance or more. The recognition threshold is set to a value greater than the above-described image detection threshold.

Here, when judged that the calculated likelihood is the recognition threshold or more (YES at step S242), the identification object detecting section 45 proceeds to S244. At step S244 (equivalent to a process serving as a function provided by "base variation area setting means"), the identification object detecting section 45 then sets the above-described first variation area B1 as the variation area (see FIG. 7).

Figure 15:
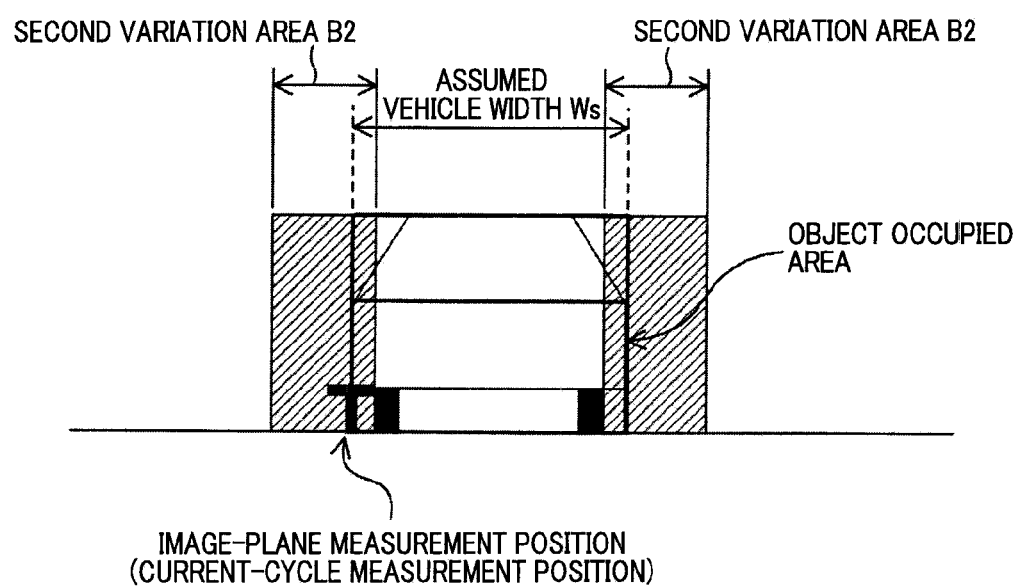
FIG. 15 is an explanatory diagram for explaining a second variation area.

On the other hand, when judged that the calculated likelihood is less than the recognition threshold (NO at step S242), the identification object detecting section 45 sets a second variation area B2 as the variation area at step S246 (equivalent to a process serving as a function provided by "widened variation area setting means"). The second variation area B2 is widened towards the center of the vehicle body, as shown in FIG. 15.

Then, the identification object detecting section 45 proceeds to step S250 and judges whether or not the current-cycle measurement position is positioned in the first variation area or the second variation area. The identification object detecting section 45 performs the processing operation at subsequent step S260 or S280 and ends the process for variation estimation.

As described above, according to the second embodiment, in the process for variation estimation, when the likelihood of the detection object calculated in the previous measurement cycle is the image detection threshold or more and less than the recognition threshold, the detection object is judged to be detected. However, the detection accuracy is not considered sufficiently high.

Therefore, instead of the first variation area B1, the second variation area B2 is set as the variation area. The second variation area B2 is the first variation area B1 that has been widened towards the vehicle main body side. As a result, detection omission of the plurality of detection objects that are positioned near one another can be suppressed.

Third Embodiment

A third embodiment of the present invention will hereinafter be described with reference to the drawings.

The device configuration is similar to that of the in-vehicle target detecting device 1 according to the first embodiment. However, the positional information generating section 43 differs in that, in addition to the positional information, a maximum value (peak value; referred to hereinafter as simply reception signal intensity) of the intensity of the reception signal inputted from the radar device 20 is outputted to the identification object detecting section 45.

In addition, the process for variation estimation performed by the identification object detecting section 45 also differs in part from that according to the first embodiment. The differences will mainly be described hereafter.

Figure 16:
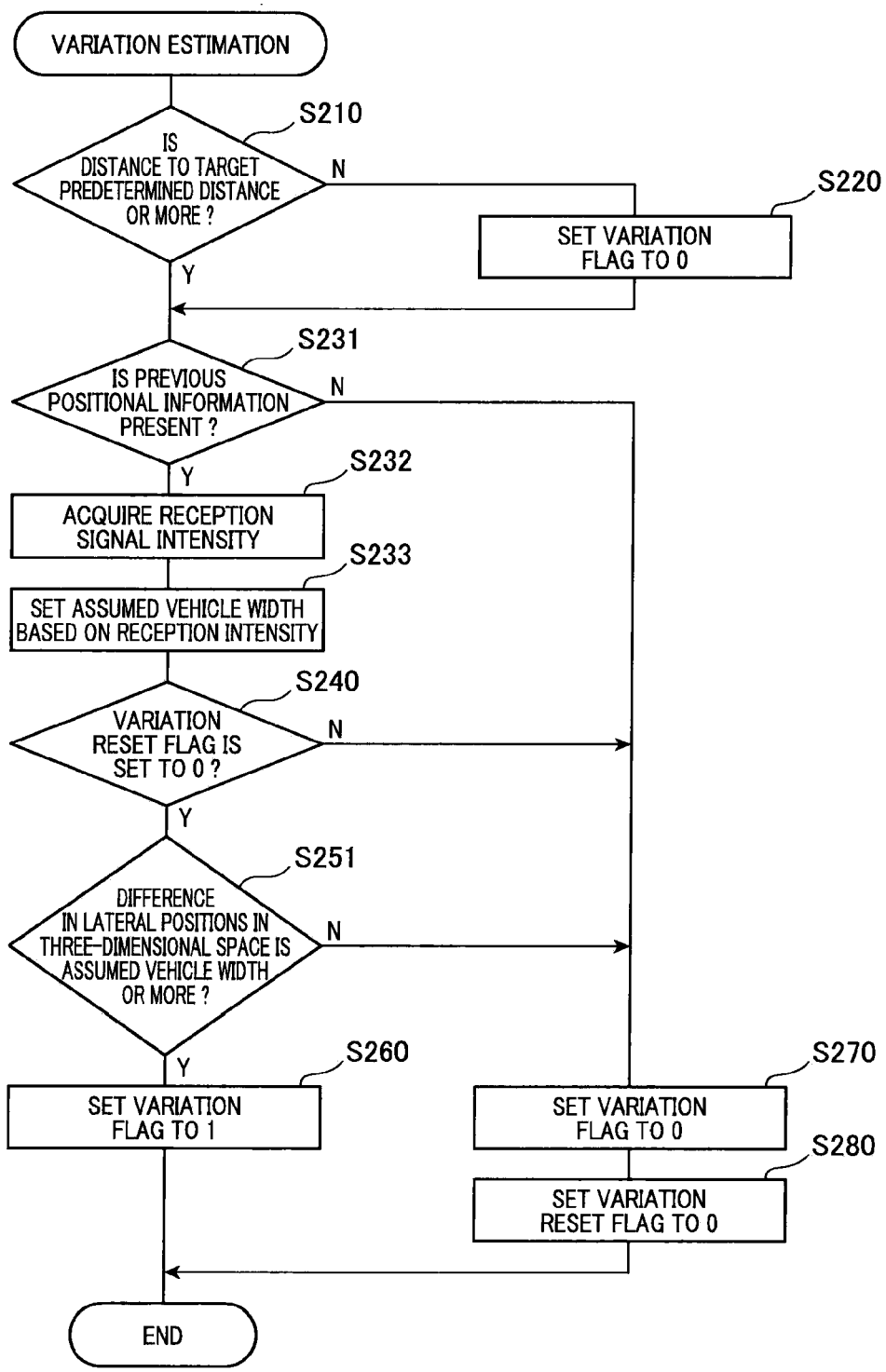
FIG. 16 is a flowchart showing a process for variation estimation according to a third embodiment.

As shown in FIG. 16, in the process for variation estimation according to the third embodiment, step S230 of the process shown in FIG. 9 is replaced with step S231. Step S232 and S233 are added to the process shown in FIG. 9. Step S250 of the process shown in FIG. 9 is replaced with step S251. In other words, when the process for variation estimation is started, the identification object detecting section 45 performs the processing operations at steps S210 and S220.

Thereafter, at step S231, the identification object detecting section 45 judges whether or not positional information (previous positional information) of the previous measurement cycle equivalent to the positional information (current positional information) acquired at step S115 (see FIG. 8) of the current measurement cycle is present.

Here, when judged that the previous positional information is not present, the identification object detecting section 45 proceeds to step S270. When judged that the previous positional information is present, the identification object detecting section 45 proceeds to step S232. Next, at step S232 (equivalent to a process serving as a function provided by "reception signal intensity acquiring means"), the identification object detecting section 45 acquires the reception signal intensity.

At subsequent step S233 (equivalent to a process serving as a function provided by "object width setting means"), the identification object detecting section 45 sets the assumed vehicle width Ws based on the reception signal intensity. The identification object detecting section 45 sets the assumed vehicle width Ws using the fact that the reception signal intensity at the radar device 20 becomes larger as the size of the vehicle becomes larger (such as a truck), if the distance from the own vehicle is the same.

Specifically, a correlation between the distance from the own vehicle and the intensity of the reception signal, based on actual measurement and the like, is acquired in advance for each vehicle size (for example, a typical passenger vehicle and a large-sized vehicle such as a truck). A boundary value of the reception signals distinguishing the passenger vehicle from the truck is set as a first intensity threshold (equivalent to an "intensity threshold"). A threshold correlation table indicating the correlation between the distance from the own vehicle and the first intensity threshold is prepared.

Then, when the reception signal intensity acquired at step S232 in the previous measurement cycle is less than the first intensity threshold set in advance, a default width set in advance is set as the assumed vehicle width Ws. The default width is set, for example, to the vehicle width of a typical passenger vehicle.

On the other hand, when the reception value intensity is the first intensity threshold set in advance or more, a width greater than the default width is set as the assumed vehicle width Ws. In this instance, the assumed vehicle width is set to the vehicle width of a truck or the like that is larger than the typical passenger vehicle.

Next, the identification object detecting section 45 performs the processing operation at step S240 and proceeds to step S251.

At step S251 (equivalent to a process serving as a function provided by "position state estimating means"), the identification object detecting section 45 detects the extent of change in the position of the target candidate (lateral position in three-dimensional space) in a direction matching the vehicle width direction of the own vehicle (lateral direction in three-dimensional space), during the period from the previous measurement cycle to the current measurement cycle. The identification object detecting section 45 detects the extent of change using the previous positional information and the current-cycle positional information (based on the millimeter waves).

When judged that the difference in the lateral positions is the assumed vehicle width Ws set at step S233 or more (YES at step S251), the identification object detecting section 45 proceeds to step S260. At step S260, the identification object detecting section 45 sets the variation flag to 1 and ends the process for variation estimation.

On the other hand, when judged that the difference between the previous measurement position and the current-cycle measurement position is less than the assumed vehicle width Ws (NO at step S251), the identification object detecting section 45 proceeds to step S270.

At step S270, the identification object detecting section 45 sets the variation flag to 0 and performs the processing operation at step S280. The identification object detecting section 45 then ends the process for variation estimation.

As described above, according to the third embodiment, the assumed vehicle width Ws is set using the fact that the reception signal intensity increases in proportion with the size of the detection target. The assumed vehicle width Ws is compared with the lateral position in three-dimensional space obtained from the detection result based on the millimeter waves. Whether or not the target candidate is composed of a plurality of detection objects is estimated.

As a result, whether or not the target candidate is composed of a plurality of detection objects can be estimated using only the detection results based on the millimeter waves, rather than by the image processing performed according to the first embodiment. Therefore, the process can be simplified.

In addition, according to the third embodiment, a second intensity threshold that is less than the first intensity threshold may be additionally set. The assumed vehicle width Ws may be set to the vehicle width of a typical compact vehicle when the reception signal intensity is less than the second intensity threshold. The assumed vehicle width Ws may be set to the vehicle width of a passenger vehicle when the reception signal intensity is the second intensity threshold or more and less than the first intensity threshold.

In this way, the assumed vehicle width Ws can be set more narrowly for the sizes of the detection objects. As a result, the processing volume of image processing can be further reduced.

According to the third embodiment, the assumed vehicle width Ws is set using the reception signal intensity of the previous measurement cycle. However, the assumed vehicle width Ws may be set using the reception signal intensity of the current measurement cycle.

Other Embodiments

The embodiments of the present invention are described above. However, the present invention is not limited to the above-described embodiments. Various embodiments are possible without departing from the spirit of the present invention.

(i) According to the above-described embodiments, in the process for variation estimation (step S130), the variation flag may be set to 1 when variation is estimated to have occurred over a predetermined number of cycles (hereinafter referred to as "variation cycle count"). Specifically, for example, when the variation cycle count is ten cycles, the process for variation estimation may be performed for every ten cycles. In addition, the process for variation estimation may be performed every ten cycles, such as to be shifted by a single cycle. As a result, effects of noise and the like can be suppressed.

(ii) According to the above-described embodiments, in the process for setting the search area, switching of the image search area (steps S310 to S330) may be prohibited when the current-cycle measurement position indicates a position directly in front of the own vehicle on the captured image plane.

This is to prevent the image search area from being unnecessarily widened, in order to detect a target candidate present in the direction directly in front of the own vehicle of which detection is of even greater importance, when, for example, the in-vehicle target detecting device 1 according to the above-described embodiments is applied to a pre-crash safety system. As a result, increase in the processing volume of image processing can be minimized.

(iii) According to the above-described embodiments, when the radar device 20 detects a plurality of target candidates, the search process is performed on only a predetermined number of target candidates (steps S120, S125, and S150), in order from the target candidate closest to the own vehicle, among the detected target candidates.

Conversely, in the next measurement cycle, the search process may be performed on the remaining target candidates. As a result, target candidates present far from the own vehicle are detected. The amount of information related to the surrounding area of the own vehicle can be increased. These pieces of information can then be used during cruising of the own vehicle.

(iv) According to the above-described embodiments, the process for variation estimation is not performed when the distance to the target candidate is less than a predetermined distance (NO at step S210). However, the process for variation estimation may be performed regardless of the distance to the target candidate.

(v) According to the above-described embodiment, the variation flag is set to 1 when a predetermined area outside of the assumed vehicle width is set as the variation area and the image-plane measurement position is positioned within the variation area. Conversely, the variation flag may be set to 1 when the image-plane measurement position is simply positioned outside of the assumed vehicle width.

(vi) According to the above-described embodiment, in the process for setting the search area (step S135), an area that is obtained by broadening the first search area in one lateral direction (own vehicle side) is set as the second search area. Conversely, an area that is obtained by broadening the first search area in both lateral directions may be set as the second search area.

(vii) According to the above-described embodiment, the detection object is a vehicle. However, the detection object is not limited thereto, and may be something other than a vehicle (such as a pedestrian).

(viii) The above-described hardware and software configuration is not limited to a specific form. Any forms are available as long as the function of each of the above-described constituent elements is possible. For example, any of the following structures is possible: a structure in which circuits, components and the like for each function of the above-described constituent elements are built independently and separately; a structure in which a plurality of functions are integrally put into one circuit, component or the like.

(ix) The processing of the foregoing components (i.e., the image processing section 41, the positional information generating section 43, and the identification object detecting section 45) or at least part of the processing may be implemented by software processing of a computer such as a processor having a central processing unit (CPU). In such a case, the program for operating the computer shall be embraced in the scope of the present invention.

The program is not limited to one that is directly executable by the CPU, and may include various forms of programs such as a program in source form, a compressed program, and an encrypted program. The program may be applied in any modes, including an application program that operates in cooperation with a control program such as an operating system (OS) and firmware in charge of control of the entire apparatus, an application program that is incorporated in part of the control program for integral operation, and software parts (software modules) that constitute such an application program.

Moreover, if the program is to be implemented and used on an apparatus that has communication capabilities to communicate with an external device through a wireless or wired line, the program may be downloaded from a server apparatus or other external node on the communication line and installed in a recording medium of the own apparatus for use. Such modes may be selected as appropriate depending on the circumstances including the function and application of the apparatus to be practiced.

What is claimed is:

1. An in-vehicle target detecting device comprising:
    image acquiring means for acquiring, at a predetermined measurement cycle, a captured image which is an image capturing an area ahead of an own vehicle;
    positional information acquiring means for transmitting and receiving radio waves to acquire positional information indicating at least an orientation and a distance of at least one target candidate in relation to the own vehicle, the target candidate reflecting the radio waves;
    image recognition means for performing image recognition to detect a detection object by searching a predetermined image search area in the captured image, the recognition means storing at least an image detection position which is a position of the detection object in the captured image;
    search area setting means for setting the image search area based on an image-plane measurement position which is a position corresponding to a measurement position in the captured image, the measurement position being a position in three-dimensional space of the target candidate indicated by the positional information acquired by the positional information acquiring means at a timing at which the captured image is acquired by the image acquiring means; and
    target state estimating means estimates whether or not the target candidate is configured by a plurality of detection objects,
    wherein the search area setting means includes:
    base search area setting means for setting a predetermined first search area set as the image search area, when the target state estimating means estimates that the target candidate is not configured by the plurality of detection objects; and
    search area switching means for switching the image search area from the first search area to a second search area which is an area obtained by broadening the first search area in a lateral direction matching a vehicle width direction of the own vehicle in the captured image, when the target state estimating means estimates that the target candidate is configured by the plurality of detection objects.

2. The in-vehicle target detecting device according to claim 1, wherein
    the search area switching means includes search area resetting means for resetting the second search area to the first search area, when the detection object is not detected within the second search area in the acquired captured image over a predetermined number of measurement cycles.

3. The in-vehicle target detecting device according to claim 2, wherein
    the second search area is an area which is obtained by broadening the first search area in the lateral direction such that, in the captured image, one lateral side of the first search area which is nearest to a position indicating the own vehicle is enlarged by a predetermined width.

4. The in-vehicle target detecting device according to claim 3, wherein
    the search area switching means includes composite search area setting means for setting a composite search area as the image search area, when the detection object is detected in a previous measurement cycle, the composite search area being a combined area of the search area in the previous measurement cycle and any one of the first search area and the second search area in a current measurement cycle.

5. The in-vehicle target detecting device according to claim 4, wherein
the search area switching means prohibits the search area switching means from switching the search area when a distance from the own vehicle to the at least one target candidate acquired by the positional information acquiring means is less than a predetermined distance.

6. The in-vehicle target detecting device according to claim 5, wherein
the target state estimating means estimates that the at least one target candidate is configured by a plurality of detection objects, when the image-plane measurement position in a current measurement cycle is positioned within a predetermined variation area of which a center is set to the image detection position detected in the image recognition in a previous measurement cycle.

7. The in-vehicle target detecting device according to claim 6, further comprising:
recognition value calculating means for calculating a recognition value indicating a degree of likelihood that the detection object is recognized within the image search area when the detection object is detected within the image search area by the image recognition means,
wherein the target state estimating means includes:
base variation area setting means for setting, when the recognition value is more than a predetermined recognition threshold, a first variation area as the variation area, the first variation area being an area that lies outside an object occupied area which is an area occupied in the captured image by the detection object that is detected by the image recognition means, the object occupied area being broadened in the lateral direction to a position away, by a predetermined distance, from an end portion of the object occupied area; and
widened variation area setting means for setting, when the recognition value is equal to or less than a predetermined recognition threshold, a second variation area as the variation area, the second variation area being an area which is obtained by broadening the first variation area toward a center of the object occupied area.

8. The in-vehicle target detecting device according to claim 7, wherein the target state estimating means includes:
correlating means for correlating the target candidate reflecting the radio waves detected by the positional information acquiring means with the detection object detected by image recognition means, based on the positional information acquired in a current measurement cycle by the positional information acquiring means and the image detection position detected in a previous cycle by the image recognition means, when a plurality of target candidates reflecting the radio waves are detected in a current measurement cycle by the positional information acquiring means;
target state estimating executing means for executing a process that estimates, with respect to the target candidate that is correlated by the correlating means, whether or not the target candidate is configured by a plurality of target candidates; and
target state estimation prohibiting means for setting the first search area as the image search area, with respect to the target candidate that is not correlated by the correlating means.

9. The in-vehicle target detecting device according to claim 8, further comprising:
priority order setting means for setting, when the positional information acquiring means detects the plurality of target candidates that have reflected the radio waves, a priority order to the detected plurality of target candidates such that the priority order becomes higher in order from the target candidate closest to the own vehicle to the target candidate farthest from the own vehicle,
wherein the image recognition means performs the image recognition of the detected plurality of target candidates in descending order of the set priority order.

10. The in-vehicle target detecting device according to claim 5, wherein
the target state estimating means includes:
reception signal intensity acquiring means for acquiring a reception signal intensity which is a maximum value of reception signal intensities of the radio waves reflected by the target candidate;
object width setting means for setting an object estimated width which is an estimated width of the detection object in the lateral direction in the three-dimensional space matching the vehicle width direction of the own vehicle, in such a manner that the object estimated width in a case where the reception signal intensity is more than a predetermined intensity threshold is wider than the object estimated width in a case where the reception signal intensity is equal to or less than the predetermined intensity threshold; and
position state estimating means for detecting, in the lateral direction in the three-dimensional space, a positional difference between the target candidate in a previous measurement cycle and the target candidate in a current measurement cycle, and estimating that the target candidate is configured by a plurality of detection objects when the detected positional difference is more than the object estimated width.

11. The in-vehicle target detecting device according to claim 1, wherein
the second search area is an area which is obtained by broadening the first search area in the lateral direction such that, in the captured image, one lateral side of the first search area which is nearest to a position indicating the own vehicle is enlarged by a predetermined width.

12. The in-vehicle target detecting device according to claim 1, wherein
the search area switching means includes composite search area setting means for setting a composite search area as the image search area, when the detection object is detected in a previous measurement cycle, the composite search area being a combined area of the search area in the previous measurement cycle and any one of the first search area and the second search area in a current measurement cycle.

13. The in-vehicle target detecting device according to claim 1, wherein
the search area switching means prohibits the search area switching means from switching the search area when a distance from the own vehicle to the at least one target candidate acquired by the positional information acquiring means is less than a predetermined distance.

14. The in-vehicle target detecting device according to claim 1, wherein
the target state estimating means estimates that the at least one target candidate is configured by a plurality of detection objects, when the image-plane measurement position in a current measurement cycle is positioned within a predetermined variation area of which a center is set to the image detection position detected in the image recognition in a previous measurement cycle.

15. The in-vehicle target detecting device according to claim 14, further comprising:
recognition value calculating means for calculating a recognition value indicating a degree of likelihood that the detection object is recognized within the image search area when the detection object is detected within the image search area by the image recognition means,
wherein the target state estimating means includes:
base variation area setting means for setting, when the recognition value is more than a predetermined recognition threshold, a first variation area as the variation area, the first variation area being an area that lies outside an object occupied area which is an area occupied in the captured image by the detection object that is detected by the image recognition means, the object occupied area being broadened in the lateral direction to a position away, by a predetermined distance, from an end portion of the object occupied area; and
widened variation area setting means for setting, when the recognition value is equal to or less than a predetermined recognition threshold, a second variation area as the variation area, the second variation area being an area which is obtained by broadening the first variation area toward a center of the object occupied area.

16. The in-vehicle target detecting device according to claim 1, wherein
the target state estimating means includes:
correlating means for correlating the target candidate reflecting the radio waves detected by the positional information acquiring means with the detection object detected by the image recognition means, based on the positional information acquired in a current measurement cycle by the positional information acquiring means and the image detection position detected in a previous cycle by the image recognition means, when a plurality of target candidates reflecting the radio waves are detected in a current measurement cycle by the positional information acquiring means;
target state estimating executing means for executing a process that estimates, with respect to the target candidate that is correlated by the correlating means, whether or not the target candidate is configured by a plurality of target candidates; and
target state estimation prohibiting means for setting the first search area as the image search area, with respect to the target candidate that is not correlated by the correlating means.

17. The in-vehicle target detecting device according to claim 1, wherein
the target state estimating means includes:
reception signal intensity acquiring means for acquiring a reception signal intensity which is a maximum value of reception signal intensities of the radio waves reflected by the target candidate;
object width setting means for setting an object estimated width which is an estimated width of the detection object in the lateral direction in the three-dimensional space matching the vehicle width direction of the own vehicle, in such a manner that the object estimated width in a case where the reception signal intensity is more than a predetermined intensity threshold is wider than the object estimated width in a case where the reception signal intensity is equal to or less than the predetermined intensity threshold; and
position state estimating means for detecting, in the lateral direction in the three-dimensional space, a positional difference between the target candidate in a previous measurement cycle and the target candidate in a current measurement cycle, and estimating that the target candidate is configured by a plurality of detection objects when the detected positional difference is more than the object estimated width.

18. An in-vehicle target detecting device comprising:
image acquiring means for acquiring, at a predetermined measurement cycle, a captured image which is an image capturing an area ahead of an own vehicle;
positional information acquiring means for transmitting and receiving radio waves to acquire positional information indicating at least an orientation and a distance of at least one target candidate in relation to the own vehicle, the target candidate reflecting the radio waves;
image recognition means for performing image recognition to detect a detection object by searching a predetermined image search area in the captured image, the recognition means storing at least an image detection position which is a position of the detection object in the captured image;
search area setting means for setting the image search area based on an image-plane measurement position which is a position corresponding to a measurement position in the captured image, the measurement position being a position in three-dimensional space of the target candidate indicated by the positional information acquired by the positional information acquiring means at a timing at which the captured image is acquired by the image acquiring means; and
priority order setting means for setting, when the positional information acquiring means detects the plurality of target candidates that have reflected the radio waves, a priority order to the detected plurality of target candidates such that the priority order becomes higher in order from the target candidate closest to the own vehicle to the target candidate farthest from the own vehicle,
wherein the image recognition means performs the image recognition of the detected plurality of target candidates in descending order of the set priority order.

19. An in-vehicle target detecting method comprising:
in an in-vehicle target detecting device mounted in an own vehicle,
acquiring, at a predetermined measurement cycle, a captured image which is an image capturing an area ahead of the own vehicle;
transmitting and receiving radio waves to acquire positional information indicating at least an orientation and a distance of at least one target candidate in relation to the own vehicle, the target candidate reflecting the radio waves;
performing image recognition to detect a detection object by searching a predetermined image search area in the captured image;
storing at least an image detection position which is a position of the detection object in the captured image;
setting the image search area based on an image-plane measurement position which is a position corresponding to a measurement position in the captured image, the measurement position being a position in three-dimensional space of the target candidate indicated by the positional information acquired at a timing at which the captured image is acquired; and estimating whether or not the target candidate is configured by a plurality of detection objects, wherein the setting step includes:

setting a predetermined first search area set as the image search area, when it is estimated that the target candidate is not configured by the plurality of detection objects; and switching the image search area from the first search area to a second search area which is an area obtained by broadening the first search area in a lateral direction matching a vehicle width direction of the own vehicle in the captured image, when it is estimated that the target candidate is configured by the plurality of detection objects.

20. An in-vehicle target detecting device comprising:

image acquiring means for acquiring, at a predetermined measurement cycle, a captured image which is an image capturing an area ahead of an own vehicle;

positional information acquiring means for transmitting and receiving radio waves to acquire positional information indicating at least an orientation and a distance of at least one target candidate in relation to the own vehicle, the target candidate reflecting the radio waves;

image recognition means for performing image recognition to detect a detection object by searching a predetermined image search area in the captured image, the recognition means storing at least an image detection position which is a position of the detection object in the captured image;

search area setting means for setting the image search area based on an image-plane measurement position which is a position corresponding to a measurement position in the captured image, the measurement position being a position in three-dimensional space of the target candidate indicated by the positional information acquired by the positional information acquiring means at a timing at which the captured image is acquired by the image acquiring means, wherein the search area setting means includes search area switching means for switching the image search area from a first search area to a second search area, based on a number of target candidates, the first search area being an area of which a center is set to the image-plane measurement position, the second search area being an area obtained by broadening the first search area.

21. An in-vehicle target detecting device comprising:

image acquiring means for acquiring, at a predetermined measurement cycle, a captured image which is an image capturing an area ahead of an own vehicle;

positional information acquiring means for transmitting and receiving radio waves to acquire positional information indicating at least an orientation and a distance of at least one target candidate in relation to the own vehicle, the target candidate reflecting the radio waves;

image recognition means for performing image recognition to detect a detection object by searching a predetermined image search area in the captured image, the recognition means storing at least an image detection position which is a position of the detection object in the captured image;

search area setting means for setting the image search area based on an image-plane measurement position which is a position corresponding to a measurement position in the captured image, the measurement position being a position in three-dimensional space of the target candidate indicated by the positional information acquired by the positional information acquiring means at a timing at which the captured image is acquired by the image acquiring means, wherein the image recognition means is configured to search for only a predetermined number of target candidates in order from a target candidate closest to the own vehicle.

* * * * *